United States Patent
Balbo Di Vinadio

(10) Patent No.: US 7,147,419 B2
(45) Date of Patent: Dec. 12, 2006

(54) ELEMENT OF FASTENING ACCESSORIES TO METAL WINDOWS AND DOORS

(75) Inventor: Aimone Balbo Di Vinadio, Turin (IT)

(73) Assignee: Savio S.p.A., Chiusa San Michele (IT)

( * ) Notice: Subject to any disclaimer, the term of this patent is extended or adjusted under 35 U.S.C. 154(b) by 0 days.

(21) Appl. No.: 11/156,805

(22) Filed: Jun. 20, 2005

(65) Prior Publication Data

US 2005/0286987 A1    Dec. 29, 2005

(30) Foreign Application Priority Data

Jun. 23, 2004    (IT) .......................... TO2004A0419

(51) Int. Cl.
*F16B 13/12* (2006.01)
*F16B 13/02* (2006.01)

(52) U.S. Cl. ................. 411/182; 411/80.6; 411/58; 52/704

(58) Field of Classification Search ............. 411/182, 411/80.5, 80.6, 58, 55, 508, 913; 52/704, 52/364

See application file for complete search history.

(56) References Cited

U.S. PATENT DOCUMENTS

| | | | | |
|---|---|---|---|---|
| 2,379,786 A | * | 7/1945 | Bugg et al. | 411/80.6 |
| 3,611,861 A | * | 10/1971 | Schulze | 411/508 |
| 3,874,264 A | * | 4/1975 | Polos | 411/80.6 |
| 4,358,234 A | * | 11/1982 | Takegawa et al. | 411/80.2 |
| 4,708,551 A | * | 11/1987 | Richter et al. | 411/32 |
| 2002/0127081 A1 | | 9/2002 | Filipp | 411/58 |

FOREIGN PATENT DOCUMENTS

| | | |
|---|---|---|
| DE | 196 07 029 C1 | 8/1997 |
| DE | 199 62 955 A1 | 7/2001 |
| EP | 1 223 274 A | 7/2002 |
| GB | 417651 | 10/1934 |

OTHER PUBLICATIONS

Copy of European Search Report for EP 05 01 3226.

* cited by examiner

*Primary Examiner*—Flemming Saether
(74) *Attorney, Agent, or Firm*—Heslin Rothenberg Farley & Mesiti P.C.; Victor A. Cardona, Esq.

(57) ABSTRACT

An element for fastening accessories to metal window and door frames includes a monolithic metal body with a cylindrical central portion having a threaded inner hole. An insertion portion has a cone frustum shape with decreasing diameter from the diameter of the cylindrical central portion towards one end. A stop portion includes a circumferential throat delimited by a shoulder whose outer diameter is greater than the diameter of the cylindrical central portion. The outer diameter of the shoulder is joined to the cylindrical central section by a cone frustum shaped segment. A first series of through longitudinal grooves extends on a part of the length of the cylindrical central portion and on the insertion portion and defines a first section deformable radially inwardly relative to a non-deformed resting configuration. A second series of through longitudinal grooves extends on a part of the length of the cylindrical central portion and on the stop portion and forms a second section deformable elastically inwardly relative to the non-deformed configuration.

Figure 1:
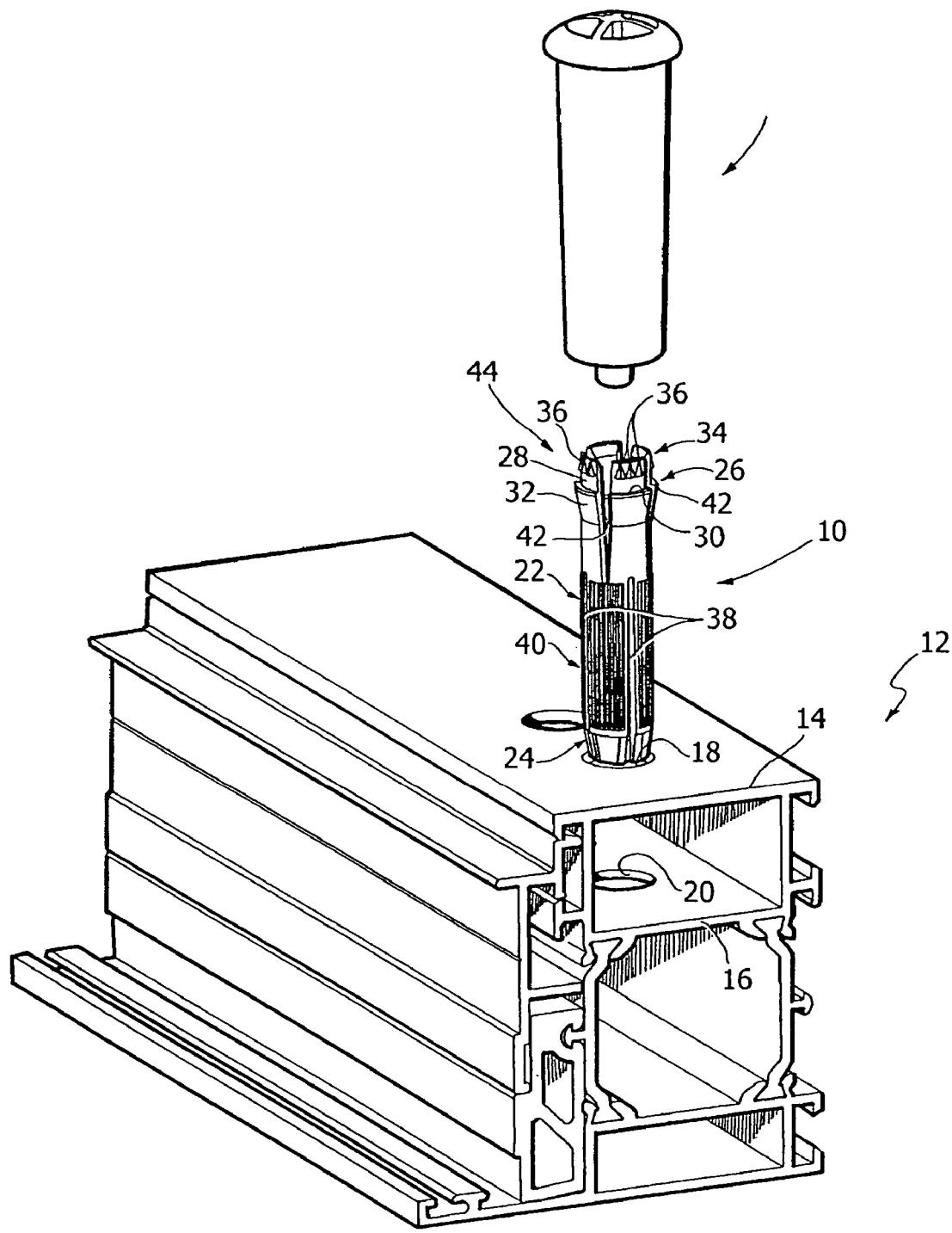

4 Claims, 4 Drawing Sheets ic material, e.g. of steel, internally provided with a threaded hole. The fastening element 10 is inserted and fastened in a metallic section bar for window and door frames. The section bar 12 has an outer wall 14 with a smooth outer surface and at least one inner wall 16 parallel to the outer wall 14. As a preliminary operation before inserting the fastening element 10, the installer drills in the walls 14, 16 concentric through holes 18 and 20 with equal diameter.

ELEMENT OF FASTENING ACCESSORIES TO METAL WINDOWS AND DOORS

CROSS REFERENCE TO RELATED APPLICATIONS

This application claims from Italian patent application TO2004A 000419, filed on Jun. 23, 2004, the entire disclosure of which is incorporated herein by reference.

The present invention relates to an element for fastening accessories to metal windows and doors.

The invention was developed in particular for fastening hinges to frames of metal windows or doors, typically made of aluminium or similar alloys. However, the invention is not limited to this specific sector of use.

To solve the problem of fastening hinges to window or door frames with considerable weight, the use of internally threaded metallic dowels is becoming increasingly widespread; such dowels are inserted and fastened within holes of the metallic section bars forming the fixed frame and the movable frame of the window or door. Once they are inserted in the respective holes, the dowels allow the use of screws for fastening the hinges.

A first example of a dowel suitable for this purpose is described in the document U.S. Pat. No. 6,702,534 which discloses a spreader dowel with a cylindrical sleeve provided with a first and with a second series of through slots which form radially expandable zones. The sleeve has an inner thread and it has a region with smaller diameter engageable by an end of the screw to produce an outward radial expansion of the sleeve. The main drawback of such a solution is that the dowel is subject to a considerable radial expansion while the screw is tightened and this can cause deformations of the window or door profile.

A second known solution is disclosed in the document WO-A-0238897 which describes a bushing for fastening hinges to aluminium windows or doors, having a self-threading outer thread which engages the holes of the metallic section bar of the window or door. The drawback of this second solution is the relatively long time imposed to the installer for fastening the self-threading dowel to the metal section bar.

The object of the present invention is to provide an enhanced fastening element which allows to overcome the problems of the prior art.

According to the present invention, said object is achieved by a fastening element having the characteristics of the present invention.

Figure 2:
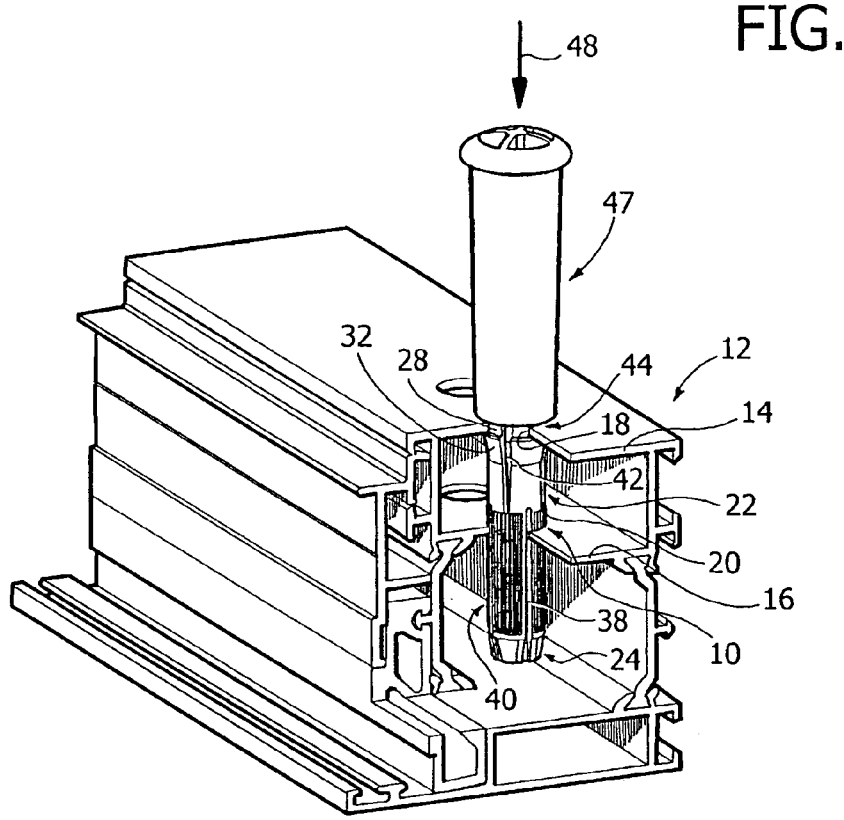
Figure 3:
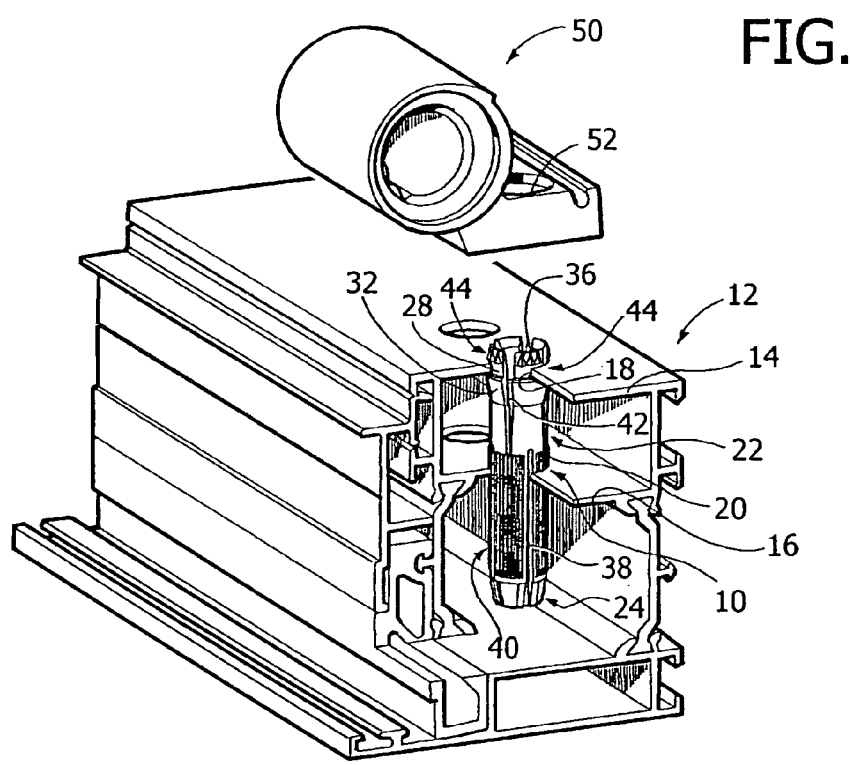
Figure 4:
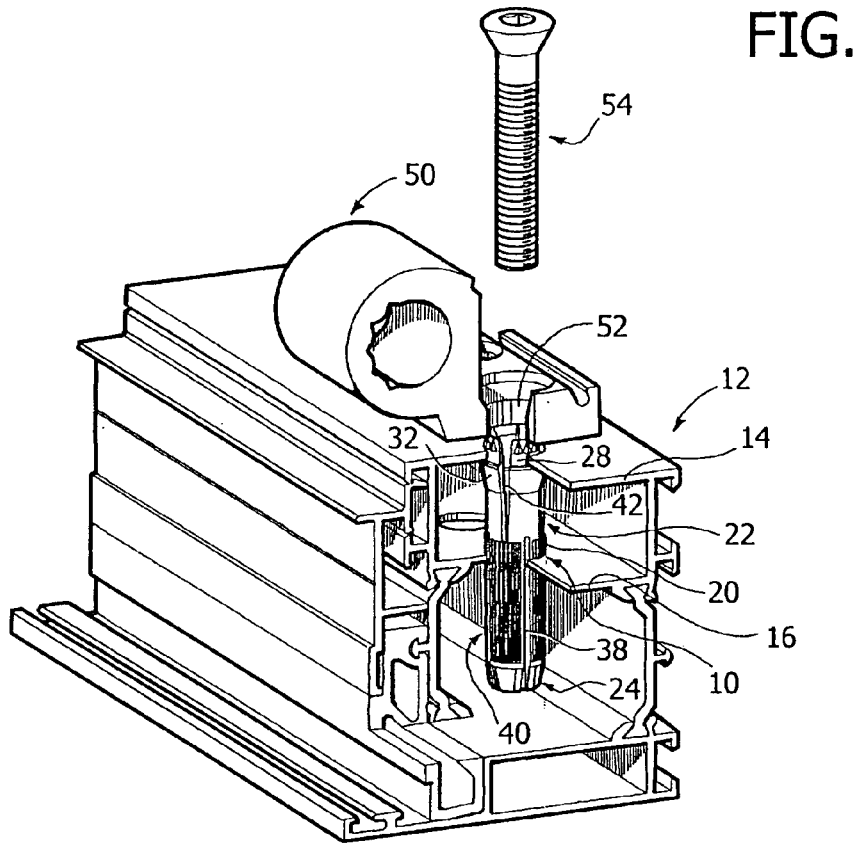
Figure 5:
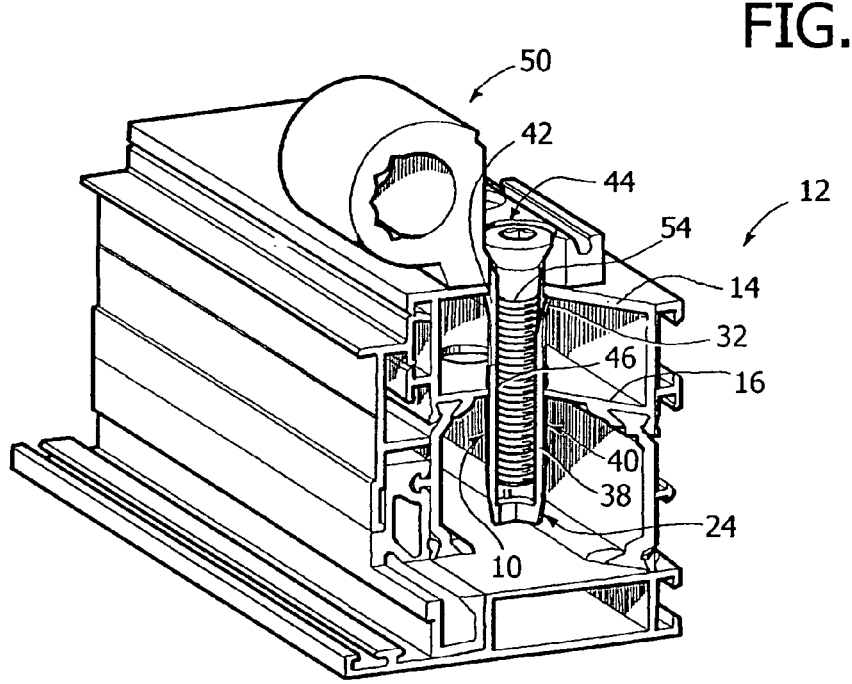
Figure 6:
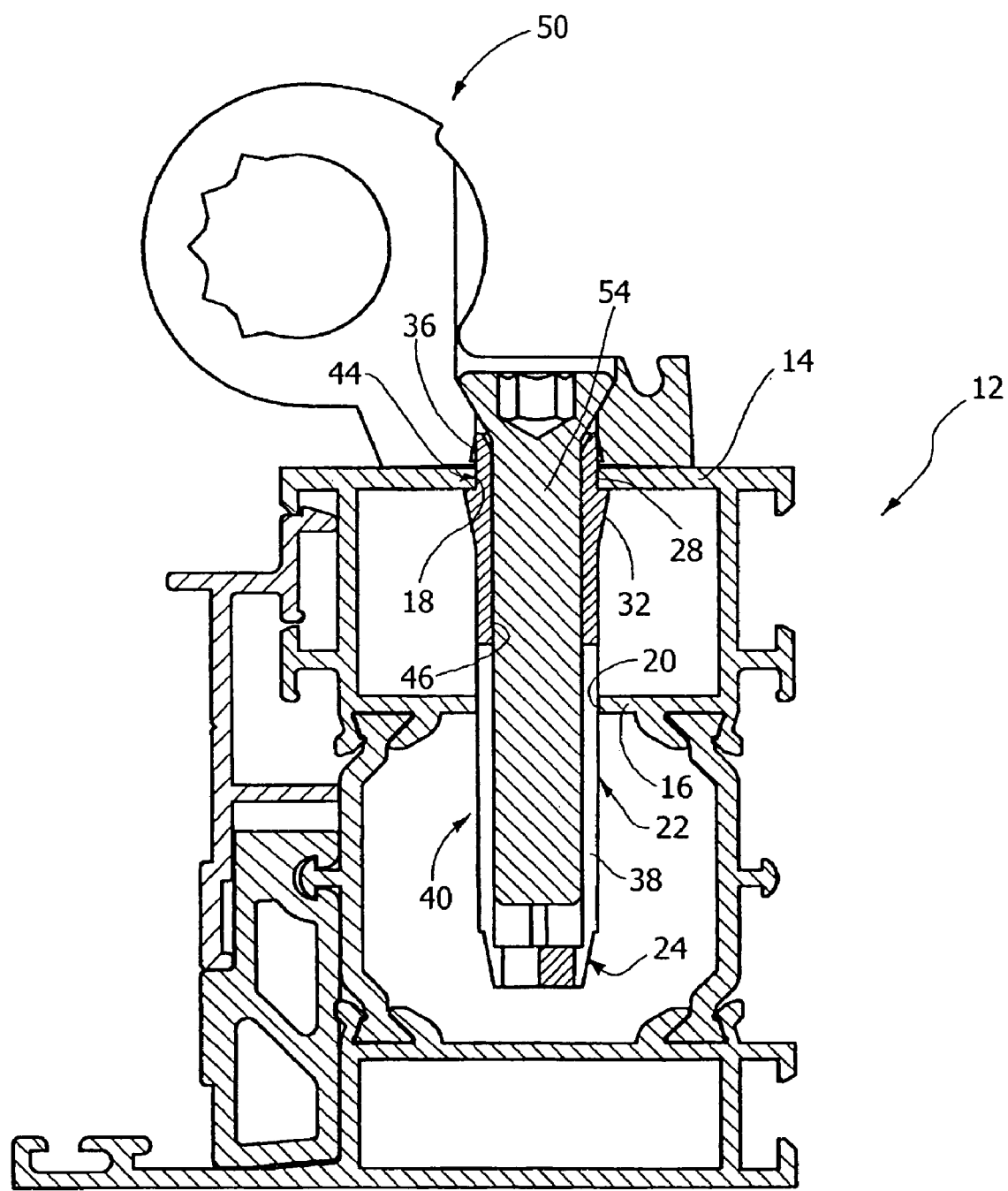

The characteristics and the advantages of the present invention shall become readily apparent in the detailed description that follows, provided purely by way of non limiting example, with reference to the accompanying drawings, in which:

FIG. 1 is a perspective view illustrating a fastening element before mounting in a metal section bar, FIGS. 2 and 3 show two mounting steps of the fastening element of FIG. 1, FIGS. 4 and 5 show the fastening of a half-hinge to the fastening element according to the invention, and FIG. 6 is an axial section that shows the fastening element and the half-hinge in mounted position.

With reference to FIG. 1, the number 10 designates a fastening element according to the present invention. The fastening element 10 is formed by a monolithic body of metallic material, e.g. of steel, internally provided with a threaded hole. The fastening element 10 is inserted and fastened in a metallic section bar for window and door The fastening element 10 has a cylindrical central portion 22 with constant diameter and two end portions 24, 26. The diameter of the holes 18, 20 is slightly smaller than the diameter of the cylindrical central portion 22. The end portion 24 serves as an insertion portion and it has a cone frustum shape with a greater diameter equal to the diameter of the cylindrical central portion 22 and tapered with conical profile towards a front end. The second end portion 26, situated at the opposite side from the insertion portion 24, serves as a stop portion. The portion 26 has a throat 28 whose diameter is substantially equal to the diameter of the cylindrical central portion 22. The throat is delimited in the axial direction by an inner shoulder 30 having a greater external diameter than the diameter of the throat 28. The outer diameter of the shoulder 30 is joined to the cylindrical central portion 22 by a cone frustum portion 32. At the opposite side from the shoulder 30, the throat 28 is delimited in the axial direction by an annular collar 34 formed by a plurality of projecting teeth 36 having pyramid shape.

The fastening element 10 is provided with a first series of through longitudinal grooves 38 that extend on a part of the cylindrical central portion 22 and on the insertion portion 24. The longitudinal grooves 38 define a first deformable section 40 able to be deformed radially inwards relative to the resting configuration. Preferably the cylindrical central portion 22 has a knurled outer surface at the first deformable portion 40.

The fastening element 10 comprises a second series of through longitudinal grooves 42 that extend on a part of the cylindrical central portion 22 and on the stop portion 26. Preferably, in the axial direction the through grooves 42 of the second series occupy the part of the cylindrical central portion 22 that is not involved by the through grooves 38 of the first series. In the circumferential direction, the through grooves 38, 42 are preferably interleaved, so that each groove 42 of the second series is substantially on the centreline with respect to two adjacent grooves 38 of the first series. The through grooves 42 of the second series form a second deformable section 44 that extends on the stop portion 26, including the throat 28 and the cone frustum shaped junction portion 32. The second deformable portion 44 is capable of deforming radially inwards with respect to the non-deformed position.

The fastening element 10 is provided with a threaded inner hole designated by the reference number 46 in FIGS. 5 and 6, which extends in the axial direction at least for the entire length of the cylindrical central portion 22. In the non-deformed resting position of the fastening element 10, the threaded hole 46 has a cylindrical shape with constant diameter equal to the nominal diameter of the inner thread of the hole 46.

With reference to FIGS. 1 and 2, the fastening element 10 is inserted in the aligned holes 18, 20 of the metal section bar 12 with a movement in the axial direction. Since the resting diameter of the cylindrical central portion 22 is slightly smaller than the diameter of the holes 18, 20, the fastening element 10 is planted inside the holes 18, 20. To perform this planting operation, a planting tool 47, able to be positioned on the head of the fastening element 10, can be used to apply, by means of a hammer, a planting force in the direction indicated by the arrow 48 in FIG. 2.

The insertion portion 24 facilitates the insertion of the fastening element 10 in the holes 18, 20 and the radial compression inwards of the first deformable section 40. During the planting operation, cone frustum junction portion 32 produces an inwards radial compression of the second deformable section 44. When the shoulder 30 of the stop portion 36 exceeds the wall thickness of the hole 18, the stop portion 26 expands until it brings the outer surface of the throat 28 in contact with the inner surface of the hole 18. In this way, a snap-on engagement is obtained of the stop portion 26 of the fastening element 10 with the wall 14 of the metal section bar 12.

FIG. 3 shows the position of the fastening element 10 at the end of its planting in the metal section bar 12. In this position, the fastening element 10 is held stably relative to the section bar 12 thanks to the engagement with slight forcing of the first deformable section 40 with the hole 20 and to the snap-on engagement of the throat 28 with the hole 18. The knurling on the outer surface of the first deformable section serves to prevent the rotation of the fastening element 10 relative to the section bar 12.

The stop portion 26 establishes a stable stop which prevents all further motion of the fastening element 10 in the axial direction with respect to the section bar 12. Once mounting is completed, the annular collar 34 of the stop portion 26 projects from the outer part of the wall 14. The two deformable sections 40, 44 of the fastening element 10 in the configuration of FIG. 3 are deformed elastically in the radial direction inwards with respect to their resting configuration.

After driving the fastening element 10 in the metallic section bar 12, the operator can fasten a half-hinge 50. In general, it will be necessary to provide two mutually parallel fastening elements 10 in order to fasten the half-hinge. The half-hinge 50 is set on the outer surface of the wall 14 of the section bar and the annular collar 34 of each fastening element 10 is positioned at a respective through hole 52 of the half-hinge 50. Hence, the mounting of the half-hinge 50 is completed inserting and screwing a fastening screw 54 in the threaded hole 46 of each fastening element 10. FIGS. 5 and 6 show the configuration after the tightening of the screw 54.

Before the insertion of the screw 54, the diameter of the threaded hole 46 is slightly smaller than the nominal diameter of the screw 54. The tightening of the screw 54 causes an outward radial expansion of the fastening element 10 so that, once the screw 54 is tightened, the outer diameter of the cylindrical central portion 22 substantially returns to the same diameter as the cylindrical portion 22 in non-deformed conditions, i.e. before planting the fastening element 10 into the holes 18, 20.

During the tightening of the screw 54, the half-hinge is pressed in axial direction against the section bar 12. The projecting teeth 36 of the annular collar 34 interfere with the inner wall of the hole 52 of the half-hinge 50 and are planted into the wall of the hole 52.

When mounting is completed, the fastening element 10 according to the present invention has an outer diameter that is substantially equal to the diameter it has in non-deformed conditions. The fastening element 10 achieves a stable and strong connection with the walls 14, 16 of the metallic section bar 12 with no need for relevant radial deformations and hence minimising the risk of deforming the section bar 12. The half-hinge 50 is driven by interference on the annular collar 34 of the stop portion 26, so a stable connection, without play, is obtained even under the action of sizeable loads. The annular collar 36 of the stop portion 26 is supported radially by the outer wall of the screw 54, so it cannot be deformed inwards as a result of the interference between the pyramid shaped teeth 36 and the wall of the hole 52 of the half-hinge 50. Moreover, when mounting is completed the screw 54 engages the inner thread 46 of the fastening element 10 substantially for the entire length of the threaded hole 46 and on a diameter equal to the nominal diameter of the threaded coupling. This allows to obtain an optimal coupling condition between the screw 54 and the threaded hole 46.

Naturally, the fastening element according to the present invention may be subject to numerous variants with respect to what is described and illustrated herein, without thereby departing from the scope of the invention as defined by the appended claims.

The invention claimed:

1. Element for fastening accessories to metal window and door frames, comprising:
   a monolithic metal body with a cylindrical central portion having a threaded inner hole,
   an insertion portion with cone frustum shape with decreasing diameter from the diameter of the cylindrical central portion towards one end,
   a stop portion comprising a circumferential throat delimited by a shoulder whose outer diameter is greater than the diameter of the cylindrical central portion, the outer diameter of the shoulder being joined to the cylindrical central section by means of a cone frustum shaped segment,
   a first series of through longitudinal grooves that extend on a part of the length of the cylindrical central portion and on the insertion portion and which define a first section able to be deformed elastically inwards relative to a non-deformed resting configuration, and
   a second series of through longitudinal grooves that extend on a part of the length of the cylindrical central portion and on the stop portion and which form a second section able to be deformed elastically inwards relative to the non-deformed resting configuration.

2. Fastening element as claimed in claim 1, wherein the stop portion has an annular collar that delimits said throat in axial direction from the opposite part relative to said shoulder.

3. Fastening element as claimed in claim 2, wherein said annular collar comprises a plurality of radially projecting teeth.

4. Fastening element as claimed in claim 1, wherein the first elastically deformable section has a knurled outer surface.

* * * * *

UNITED STATES PATENT AND TRADEMARK OFFICE
CERTIFICATE OF CORRECTION

PATENT NO.       : 7,147,419 B2                                       Page 1 of 1
APPLICATION NO.  : 11/156805
DATED            : December 12, 2006
INVENTOR(S)      : Balbo Di Vinadio It is certified that error appears in the above-identified patent and that said Letters Patent is hereby corrected as shown below:

On the title page item (57), Abstract:

Line 15, after "grooves" insert -- that --

Line 16, change "extends" to -- extend --

Signed and Sealed this

Twenty-seventh Day of March, 2007

JON W. DUDAS
*Director of the United States Patent and Trademark Office*